(12) United States Patent
Cao et al.

(10) Patent No.: US 9,041,357 B2
(45) Date of Patent: May 26, 2015

(54) APPARATUS FOR MINIMIZING SELF-DISCHARGE OF A SMART BATTERY PACK

(75) Inventors: Cindy P. Cao, Lawrenceville, GA (US); Donald L. Flowers, Dacula, GA (US); Frederick J. Weissinger, Duluth, GA (US)

(73) Assignee: Motorola Solutions, Inc., Schaumburg, IL (US)

(*) Notice: Subject to any disclaimer, the term of this patent is extended or adjusted under 35 U.S.C. 154(b) by 463 days.

(21) Appl. No.: 13/453,828

(22) Filed: Apr. 23, 2012

(65) Prior Publication Data

US 2013/0278220 A1    Oct. 24, 2013

(51) Int. Cl.
*H02J 7/00* (2006.01)
*H01M 10/42* (2006.01)
*H01M 10/0525* (2010.01)

(52) U.S. Cl.
CPC ...... *H01M 10/4257* (2013.01); *H01M 10/0525* (2013.01); *H01M 2010/4271* (2013.01)

(58) Field of Classification Search
USPC .................................................. 320/134–137
See application file for complete search history.

(56) References Cited

U.S. PATENT DOCUMENTS

| | | | |
|---|---|---|---|
| 5,155,428 A | 10/1992 | Kang | |
| 5,729,061 A | 3/1998 | Narita | |
| 5,783,322 A | 7/1998 | Nagai | |
| 6,268,713 B1 | 7/2001 | Thandiwe | |
| 6,653,816 B2 | 11/2003 | Peek | |
| 8,593,112 B2* | 11/2013 | An et al. | 320/134 |
| 2010/0109765 A1 | 5/2010 | Esnard et al. | |
| 2011/0057622 A1 | 3/2011 | Kim | |
| 2011/0156654 A1* | 6/2011 | Kim et al. | 320/134 |
| 2012/0032646 A1* | 2/2012 | Lee | 320/135 |

FOREIGN PATENT DOCUMENTS

| | | | |
|---|---|---|---|
| EP | 319020 A1 | 6/1989 | |
| EP | 542365 A1 | 5/1993 | |
| EP | 2175543 A1 | 4/2010 | |
| WO | 03107507 A1 | 12/2003 | |

OTHER PUBLICATIONS

PCT International Search Report mailed Jul. 3, 2013 issued in counterpart International Application No. PCT/US2013/032978.

* cited by examiner

*Primary Examiner* — Binh Tat
(74) *Attorney, Agent, or Firm* — Barbara R. Doutre

(57) ABSTRACT

An apparatus for minimizing self-discharge of a smart battery pack is provided. During initial storage of the smart battery pack (100), prior to be being charged, a self-discharge protection circuit (110) disables smart battery circuitry (130). A minimal current drain is maintained while the smart battery circuitry (130) is disabled. Upon coupling of the smart battery pack (100) to a charger, the protections circuit (110) enables the smart battery circuitry (130). Battery packs having to be shipped with partially drained cells as part of shipping precaution requirements are no longer faced with the additional drainage problem previously caused by the smart battery circuitry (130) during storage.

11 Claims, 4 Drawing Sheets

APPARATUS FOR MINIMIZING SELF-DISCHARGE OF A SMART BATTERY PACK

FIELD OF THE DISCLOSURE

The present disclosure relates generally to the operation of batteries and the minimization battery self-discharge.

BACKGROUND

With the advancements made in battery technology, smart batteries are continuing to be developed to faciliate power management operations. Smart battery packs typically include an integrated circuit and supporting circuitry that monitor various battery parameters as part of a power management scheme supported by a charger or radio coupled to the smart battery pack.

Storage of battery packs having the additional smart battery circuitry tend to self-discharge faster than those without the smart battery circuitry. The increase in self-discharge is the result of the smart battery circuitry load on the cells within the pack. The increase in self-discharge of a smart battery pack is exacerbated for certain cell technologies, such as lithium-ion (Li-ion), that require a 30 to 50 percent charge state for precautionary shipping purposes. When the time comes to put such battery packs in service, possibly a year later, the battery packs cannot be used, because the cells are so deeply discharged as to be non-recoverable. Thus, the self-discharge problem of smart battery packs can be a costly concern from a storage or inventory standpoint.

Accordingly, there is a need to minimize self-discharge of a smart battery pack.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
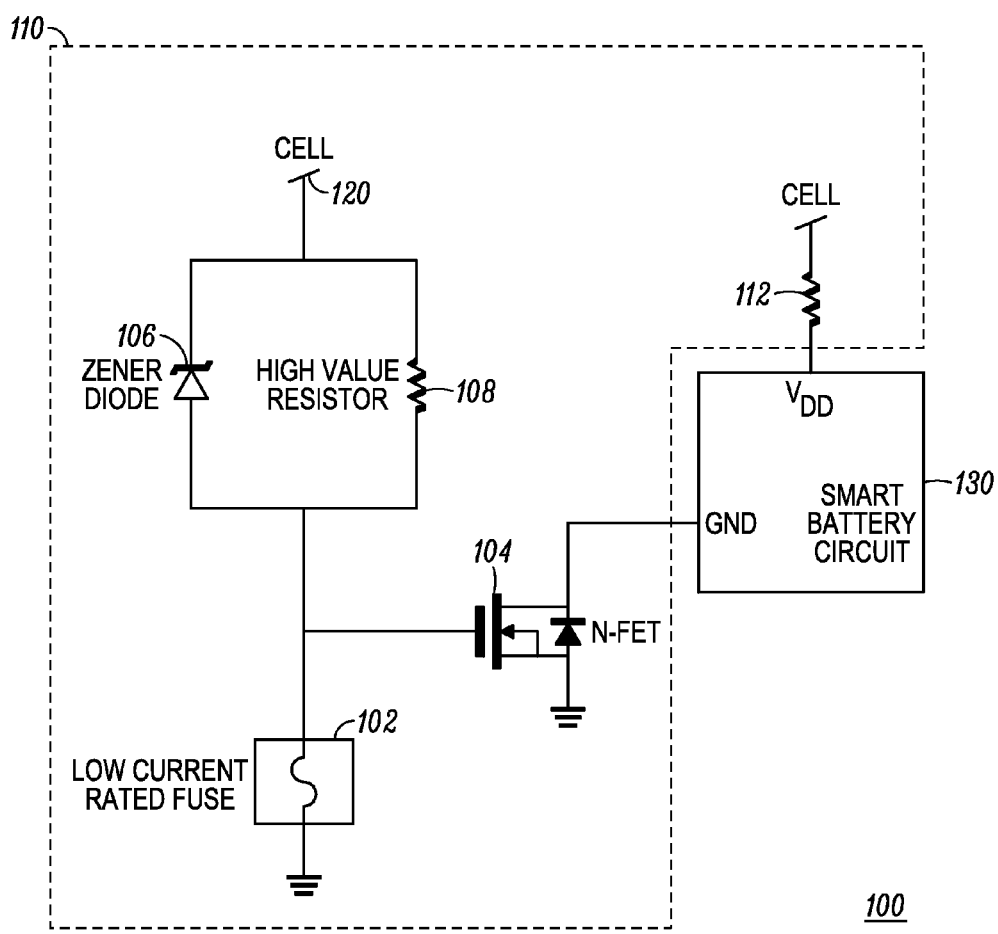
FIG. 1 is a circuit diagram of a smart battery pack having a self-discharge protection circuit formed and operating in accordance with a first embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein, an apparatus for minimizing battery pack self-discharge to allow a battery pack to be stored in inventory for a longer time. A protection circuit provided to the battery pack allows the pack to operate in a deep sleep mode during initial storage. When the battery pack is placed in a charger for the first time, the protection circuit activates the smart battery circuitry. The protection circuit may further include a trip circuit, for later storage, which shuts down the smart battery circuitry after usage in a charger, radio, or other electronic device.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 2:
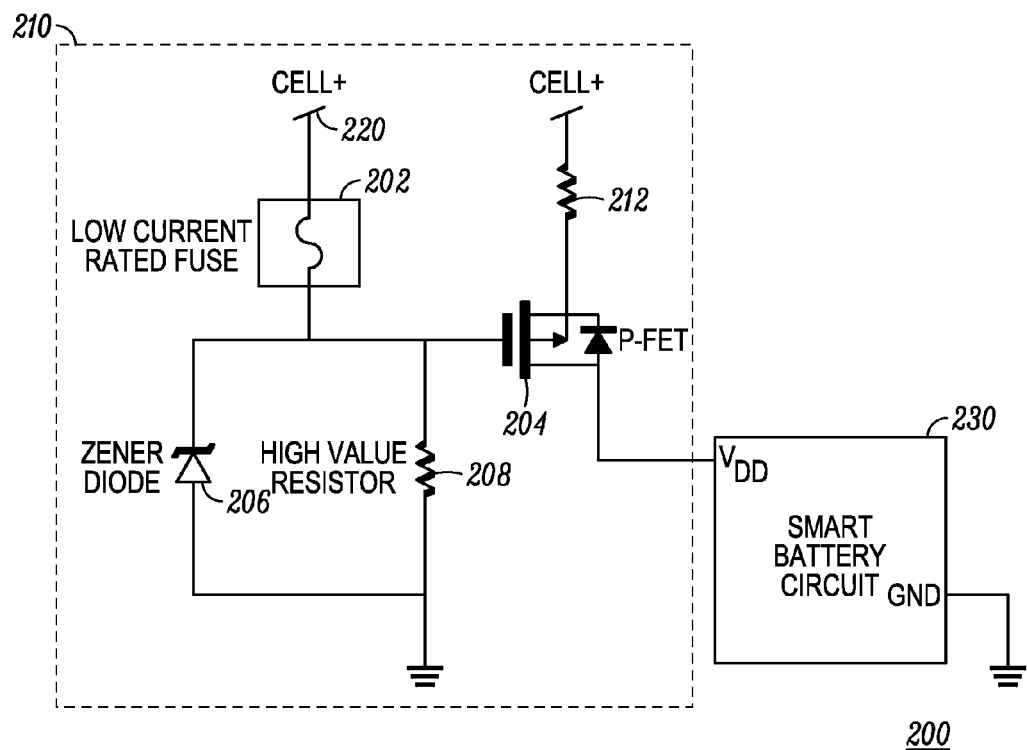
FIG. 2 is a circuit diagram of a smart battery pack having a self-discharge protection circuit formed and operating in accordance with a second embodiment.

FIGS. 1 and 2 show smart battery packs 100, 200, each having a self-discharge protection circuit 110, 210, formed and operating in accordance with the various embodiments embodiment. Each battery pack 100, 200 comprise smart battery circuitry 130, 230 respectively. For the purposes of this application, smart battery circuitry 130, 230 comprises any circuitry within the battery pack which is used in the operation of a product, such as a charger, radio or other communication device. Smart battery circuitry 130, 230 may comprise, for example, a microprocessor, communication circuitry, and operation circuits which are used to interface with another device. For example, smart battery circuitry 130, 230 may comprise a smart battery technology integrated circuit (IC) and supporting circuitry known in the art, such as power management circuitry, wireless circuitry, and/or communication circuitry. In accordance with the various embodiments, during initial storage of the smart battery packs 100, 200, prior to be being charged, protection circuits 110, 210 disable smart battery circuitry 130, 230 respectively. A minimal current drain is maintained while the smart battery circuitry 130, 230 is disabled. The smart battery circuitry 130 is maintained switchably disabled by floating a GND input to the smart battery circuitry. The smart battery circuitry 230 is maintained switchably disabled by floating a supply input to the smart battery circuitry. Upon coupling of the smart battery pack 100, 200 to a charger, the protections circuits 110, 210 enable the smart battery circuitry 130, 230. Detailed operation for FIG. 1 and FIG. 2 follow.

Referring to FIG. 1, the circuit diagram of the smart battery pack 100 having the self-discharge protection circuit 110 is shown formed and operating in accordance with a first embodiment. Again, the smart battery pack 100 comprises one or more battery cells 120, which may be coupled in series or parallel and smart battery circuitry 130. In accordance with a first embodiment, protection circuit 110 minimizes self-discharge of the smart battery pack 100 during initial storage which would otherwise be caused by smart battery circuitry 130. Initial storage of the smart battery pack 100 is the condition of the battery pack at any time prior to a first charging of the pack.

In accordance with the first embodiment, self-discharge protection circuit 110 comprises a very low current rated fuse 102, a field-effect transistor, (in this case an N-FET) 104, a zener diode 106, a high value pull-up resistor 108, and another pull up resistor 112. In this embodiment, the N-FET 104 is placed between the smart battery circuitry 130 (load) and ground to operate as a switch. The N-FET's source is coupled to ground, and the N-FET's drain is coupled to a GND input of the smart battery circuitry 130. This embodiment allows the gate drive or switching signal provided by the protection circuit 110 to be referenced to ground (low-side switching). When the gate goes LOW the N-FET 104 turns "OFF", and when the gate goes HIGH, the N-FET 104 turns "ON."

The zener diode 106 (cathode side) and high value pull-up resistor 108 are parallel coupled to a positive terminal of the cell(s) 120. The anode side of parallel coupled zener diode 106 and high value resistor 108 are coupled to the gate of N-FET 104 and also coupled to the low current rated fuse 102. The zener diode 106 is selected to have a predetermined rated voltage set close to the maximum voltage rating of the cell pack when the pack is fully charged. The high value pull-up resistor 108 is selected for a predetermined current through the low current rated fuse 102. Hence, the predetermined current and voltage ratings are selected to keep the fuse 102 shorted/closed to disable the smart battery circuitry 130 during initial storage and opened/blown upon initial charging to enable the smart battery circuitry 130.

During storage, prior to being initially charged, the battery pack cell voltage is in a partially discharged state, for example at 30-50 percent, thus no current is conducted through the zener diode 106, and a very low current passes through the high value resistor 108 and fuse 102. The low current rated fuse 102 thus presents a short to ground to the gate of N-FET 104. The gate of N-FET 104 being pulled low maintains the smart battery circuitry 130 off, while the very low current is maintained through the low current rated fuse 102. The low current being drawn through the low current rated fuse 102 while the smart battery circuitry 130 is off represents the deep sleep condition for the smart battery pack 100 while the pack is being stored.

When the smart battery pack 100 is coupled to a charger for initial charging, the cell voltage of the smart battery pack 100 increases. When the cell voltage increases beyond the voltage rating of the zener diode 106, current will conduct through the zener diode 106 thereby opening the low current rated fuse 102. Once the low current rated fuse 102 has opened, the gate of the N-FET 104 is pulled high via pull-up resistor 108, thereby turning on the N-FET 104. Turning the N-FET 104 on pulls the GND input of smart battery circuit 130 low, which enables the smart battery circuit 130. Resistor 112 is a current limiting element for the smart circuit.

Hence, the self-discharge protection circuit 110 of FIG. 1 allows the smart battery pack 100 to be stored under a deep sleep mode with the smart battery circuitry maintained off, until initial charging of the battery pack causes the protection circuit to enable the smart battery circuitry 130. The protection circuit 110 allows battery manufacturers, to keep a smart battery pack in inventory while minimizing self-discharge. During storage, the FET 104 keeps the high self discharge smart battery circuit disconnected. Once the battery is inserted in the charger, smart battery circuitry can begin operation.

As an example, for a two-cell smart battery pack comprising two lithium-ion cells having a maximum charge voltage of 8.4 volts, the predetermined voltage rating of the zener diode may be selected to be 8.2 Volts, the high value resistor may be selected to be 1 mega-ohm, and the low current rated fuse may be selected for a rating of 100 mA. The current rating of the fuse 102 is selected to be just enough to hold the FET off while minimizing current drain. Various values can be selected based on the operating parameters for the battery pack. The FET switches are preferred. While electronic switches other than FETS could be utilized, other implementations would be more costly and less efficient.

FIG. 2 shows a circuit diagram of a smart battery pack 200 having a self-discharge protection circuit 210 formed and operating in accordance with a second embodiment. Battery pack 200 includes one or more battery cells 220 which may be coupled in parallel or series, and smart battery circuitry 230 as described previously. In accordance with a second embodiment, self-discharge protection circuit 210 minimizes self-discharge of the battery pack 200, which would otherwise be caused by smart battery circuit 230, by having the battery pack 200 operate in a deep sleep state prior to being coupled to a charger or other device.

In accordance with the second embodiment, self-discharge protection circuit 210 comprises a very low current rated fuse 202, a field-effect transistor, (P-FET) 204, a zener diode 206, a high value pull-down resistor 208, and a pull up resistor 212. In this embodiment, the smart battery circuit 230 (load) is coupled directly to ground and the supply input (VDD) is switchably controlled by the P-FET 204. The P-channel FET 204 is coupled between the smart battery circuitry 230 and the positive supply of cells 220 through resistor 212 to operate as a switch. The gate drive or switching is thus referenced to supply (high-side switching) When the gate goes HIGH the P-FET turns "OFF", and when the gate goes LOW, the P-FET 204 turns "ON."

The zener diode 206 (anode side) and high value pull-down resistor 208 are parallel coupled to a negative terminal of the one or more cell(s) 220. The cathode side of parallel coupled zener diode 206 and high value resistor 208 are coupled to the gate of P-FET 204 and also coupled to the low current rated fuse 202. The high value resistor 208 is selected for a predetermined current through the low current rated fuse 202 (sufficient to initially keep the gate of P-FET 204 pulled high). The zener diode 206 is selected to have a predetermined voltage rating close to the maximum voltage rating of the battery pack 200. The voltage presented to the gate of P-FET 204 is thus maintained sufficiently high to prevent the P-FET 204 from being switched on thereby maintaining the smart battery circuitry 230 off, while a very low current is maintained through the low current rated fuse 202. Maintaining the low current through the fuse 202 while the smart battery circuitry 230 is off provides the deep sleep condition for the battery pack 200 while the pack is being stored, prior to initial charging.

When the battery pack 200 is coupled to a charger, the cell voltage increases from its partially discharged state, which as described previously may be a 30-50 percent charge state. This increased voltage presented at the cell terminal(s) is higher than the rated voltage of the zener diode voltage thus causing current to conduct through the zener diode 206. The low current rated fuse 202 opens in response to the higher current flow through the zener diode 206. Once the low current fuse 202 has opened, the gate of the P-FET 204 is pulled low via pull-down resistor 208, thereby turning on the P-FET 204. Turning on the P-FET 204, pulls the source terminal high through resistor 212 thus providing the cell voltage (CELL+) to the supply input (VDD) of smart battery circuitry 230. Turning on the P-FET thus turns on the smart battery circuitry 230.

Hence, the protection circuit of FIG. 2 allows the battery pack 200 to be stored in a deep sleep mode with the smart battery circuitry 230 turned off, and then upon initial activation within a charger, the self-discharge protection circuit 210 turns on the smart battery circuitry 230. The protection circuit 210 allows battery manufacturers, to keep a smart battery in inventory by keeping the high self discharge smart battery circuitry disabled. Once the battery pack 200 is coupled to a charger, the smart battery circuit 230 can begin operation.

Accordingly, self-discharge protection circuits 110 or 210 minimize self-discharge to allow a smart battery pack 100, 200 to be stored in inventory in a deep sleep state. This will allow the manufacturer to keep the smart battery pack 100, 200 in inventory much longer. The use of the very low current rated fuse minimizes drain on the battery cell(s) of the battery pack.

Figure 3:
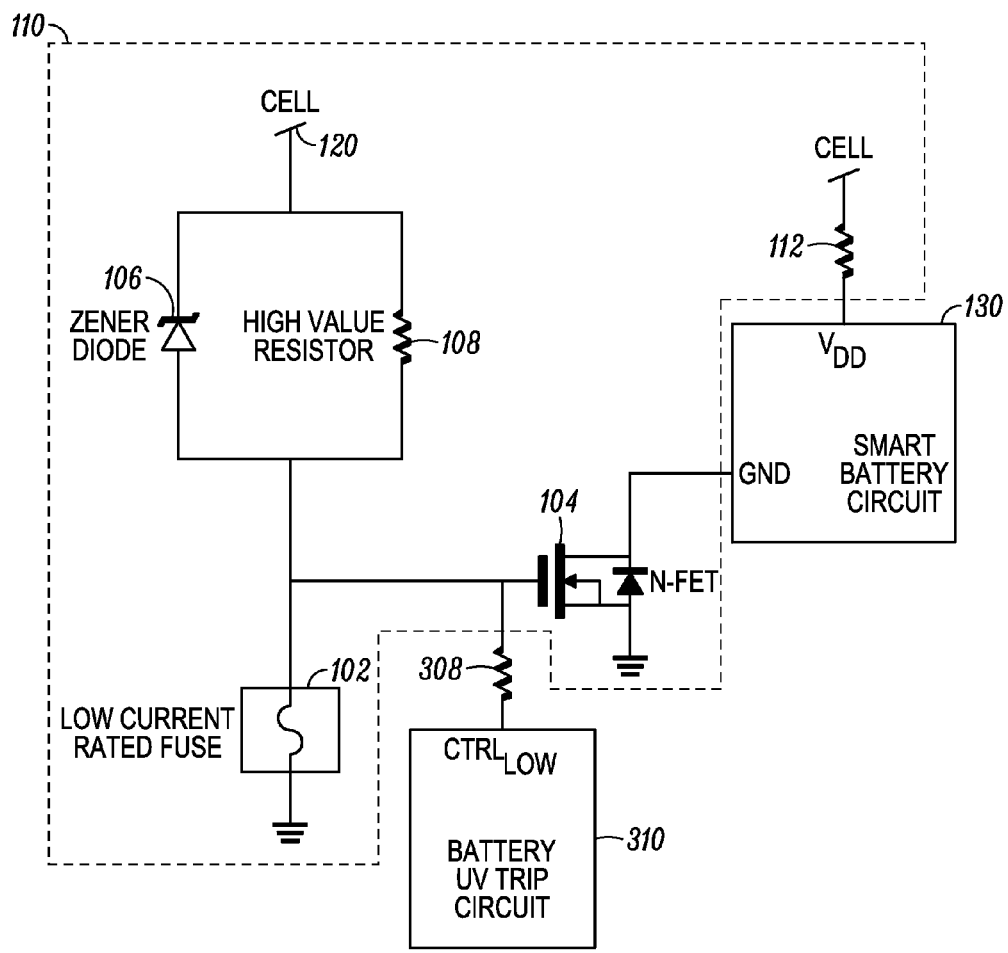
FIG. 3 is a circuit diagram of a smart battery pack having a self-discharge protection circuit formed and operating in accordance with a third embodiment.
Figure 4:
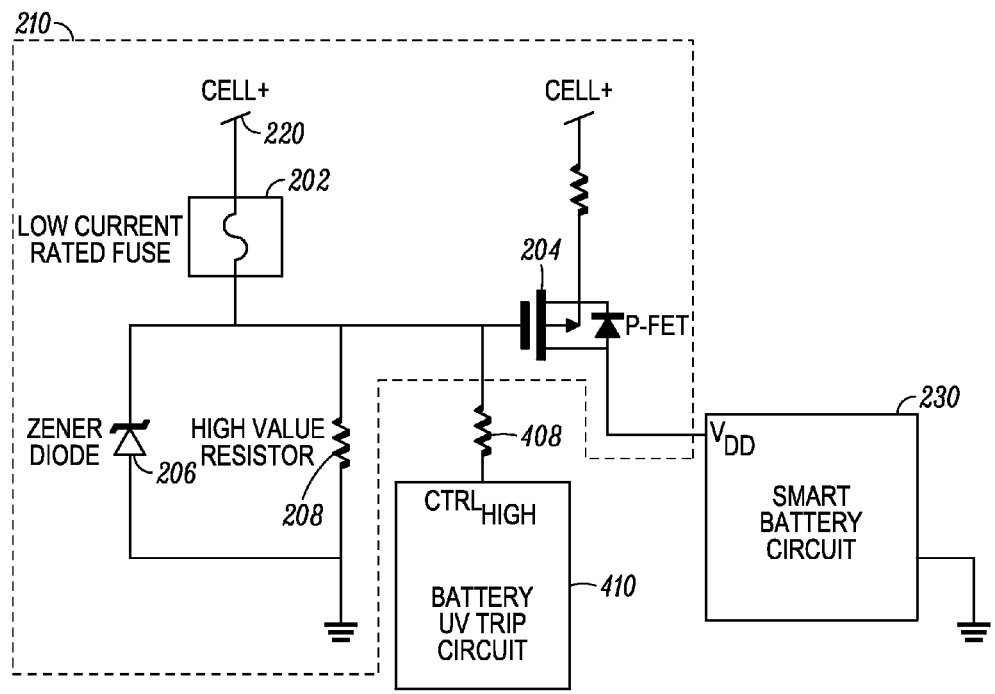
FIG. 4 is a circuit diagram of a smart battery pack having a self-discharge protection circuit formed and operating in accordance with a fourth embodiment.

In addition to the deep sleep mode for initial storage, FIG. 3 and FIG. 4 show circuit diagrams that enable the battery pack to be stored for extended periods of time after usage without draining the cells of the battery by the smart battery circuitry 130, 230. The embodiments of FIGS. 3 and 4 operate as described in FIGS. 1 and 2 for initial storage. After initial storage and opening of the low current rated fuse 102 or 202, a user may wish to store the battery for an extended period of time without draining the cells 120, 220 by the smart battery circuit 130 or 230. In these embodiments an additional voltage control from an under-voltage (UV) trip circuit 310 or 410 commands the FET 104 or 204 to disconnect the high current draining cells.

In the third embodiment shown in FIG. 3, after initial storage and opening of the fuse 102, the cells 120 are tripped by a battery under voltage (UV) trip circuit 310. A voltage control from the UV trip circuit 310 forces the N-FET 104 to disconnect the high current draining cells by pulling the N-FET low through resistor 308. Hence, the cells 120 are not drained any further by the smart battery circuitry 130, thus allowing the smart battery pack 100 to be stored for a longer period of time.

In the fourth embodiment shown in FIG. 4, after initial storage and opening of the fuse 202, the cells 220 are tripped by a battery under voltage (UV) trip circuit 410. A voltage control from the UV trip circuit 410 forces the P-FET 204 to disconnect the high current draining cells by pulling the P-FET high through resistor 408. Hence, the cells 220 are not drained any further by the smart battery circuitry 230, thus allowing the battery pack 200 to be stored for a longer period of time.

A smart battery pack formed and operating in accordance with the various embodiments minimizes self-discharge for extended shelf life. The various embodiments are of benefit to both the manfucater (or other keeper of the battery packs) prior to usage as well as to the user after usage. Extending the shelf life and minmizing cell drainage is beneficial for all cell technology types, however it is particlularly desirable for cell technologies requiring partial charge states during shipping, such as li-ion battery packs. The battery packs can now be shipped at this discharged state without further draining of the cells. Being able to store and re-enable battery packs in the manner provided by the various embodiments thus minimizes cost and allows the smart battery circuitry included within the battery pack without detriment to the cells.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A smart battery pack, comprising:
   one or more cells;
   smart battery circuitry; and
   a protection circuit for initial storage, prior to being charged, of the smart battery pack, the protection circuit minimizing self-discharge during initial storage by electronically disabling the smart battery circuitry, and the protection circuit enabling the smart battery circuitry in response to the smart battery pack being coupled to a charger for the first time; and
   wherein the protection circuit comprises:
     an electronic switch comprising a n-channel field-effect transistor (N-FET);
     a fuse having a predetermined low current rating;
     a resistor having a predetermined high resistance value;

a zener diode having a predetermined voltage rating lower than a maximum charged voltage of the smart battery pack, wherein the zener diode has a cathode and an anode, and the cathode of the zener diode and the resistor are parallel coupled to a positive terminal of the one or more cell(s), and the anode of the zener diode and the resistor are parallel coupled to the fuse and coupled to a gate of the N-FET; and the resistor limits current through the fuse to ground (GND) thereby holding the gate of the N-FET low to prevent the N-FET from being switched on thereby maintaining the smart battery circuitry off and minimizing self-discharge during the initial storage of the smart battery pack.

2. The smart battery pack of claim 1, wherein the smart battery circuitry comprises one or more of: power management circuitry, communication circuitry and wireless circuitry.

3. The smart battery pack of claim 1, wherein the smart battery circuitry is maintained switchably disabled by floating a GND input to the smart battery circuitry.

4. The smart battery pack of claim 1, wherein the smart battery circuitry is maintained switchably disabled by floating a supply input to the smart battery circuitry.

5. The smart battery pack of claim 1, wherein:
in response to exceeding the voltage rating of the zener diode, current flows through the zener diode and opens the fuse, thereby turning ON the N-FET through the pull-up resistor and enabling the smart battery circuitry.

6. The smart battery pack of claim 5, wherein the protection circuit further comprises an under voltage (UV) trip circuit coupled to the N-FET for turning OFF the smart battery circuitry after enablement of the smart battery circuitry.

7. The smart battery pack of claim 1, wherein the initial storage of the smart battery pack is a condition of the smart battery pack at any time prior to the first charging of the smart battery pack.

8. The smart battery pack of claim 1, wherein the self-discharge is the result of the smart battery circuitry being a load on the cells within the smart battery pack.

9. A smart battery pack, comprising:
one or more cells;
smart battery circuitry; and
a protection circuit for initial storage, prior to being charged, of the smart battery pack, the protection circuit minimizing self-discharge during initial storage by electronically disabling the smart battery circuitry, and the protection circuit enabling the smart battery circuitry in response to the smart battery pack being coupled to a charger for the first time; and
wherein the protection circuit comprises:
an electronic switch, comprising a p-channel field-effect transistor (P- FET);
a fuse having a predetermined low current rating;
a resistor having a predetermined high resistance value;
a zener diode having a predetermined voltage rating lower than a maximum charged voltage of the smart battery pack, and the zener diode has a cathode and an anode, and the cathode of the zener diode and the resistor are parallel coupled between a gate of the P-FET and ground (GND);
the fuse is coupled between the gate of the P-FET and the one or more cells; and
the resistor limits current through the fuse while maintaining the gate of the P-FET sufficiently high to prevent the P-FET from being switched on thereby maintaining the smart battery circuitry off thereby minimizing self-discharge during the initial storage of the smart battery pack.

10. The smart battery pack of claim 9, wherein:
in response to exceeding a predetermined voltage for the zener diode, current flows through the zener diode and opens the fuse, thereby pulling the gate of the P-FET to GND via the resistor which turns ON the P-FET and enables the smart battery circuitry.

11. The smart battery pack of claim 10, wherein the protection circuit further comprises and under voltage (UV) trip circuit coupled to the P-FET for turning OFF the smart battery circuitry after enablement of the smart battery circuitry.

* * * * *